United States Patent [19]
Odagawa

[11] Patent Number: 5,349,530
[45] Date of Patent: Sep. 20, 1994

[54] DIRECTION DETECTING DEVICE

[75] Inventor: Satoshi Odagawa, Kawagoe, Japan

[73] Assignee: Pioneer Electronic Corporation, Tokyo, Japan

[21] Appl. No.: 910,244

[22] Filed: Jul. 9, 1992

[30] Foreign Application Priority Data

Jul. 10, 1991 [JP] Japan .................. 3-170059

[51] Int. Cl.$^5$ ............................... G06F 15/50
[52] U.S. Cl. .................... 364/449; 364/454; 342/357; 340/988
[58] Field of Search ............ 364/443, 449, 453, 454, 364/459; 342/357, 358, 451, 457; 349/988, 990, 995; 33/356, 357; 73/178 R

[56] References Cited

U.S. PATENT DOCUMENTS

| | | | |
|---|---|---|---|
| 4,743,913 | 5/1988 | Takai | 342/357 |
| 4,903,212 | 2/1990 | Yokouchi et al. | 364/443 |
| 4,912,645 | 3/1990 | Kakihara et al. | 364/449 |
| 4,924,402 | 5/1990 | Ando et al. | 364/449 |
| 5,060,162 | 10/1991 | Ueyama et al. | 364/454 |
| 5,119,301 | 6/1992 | Shimizu et al. | 364/449 |

OTHER PUBLICATIONS

European search Report Application No. EP 92306329.1 dated Sep. 28, 1992.

Primary Examiner—Gary Chin
Attorney, Agent, or Firm—Kane, Dalsimer, Sullivan, Kurucz, Levy, Eisele and Richard

[57] ABSTRACT

A direction detecting device includes the following elements. A position measurement unit receives an electric wave from a satellite and generates first direction data from the electric wave. A geomagnetic sensor generates second direction data. A memory unit, which is coupled to the position measurement unit and the geomagnetic sensor, stores the first direction data and the second direction data respectively obtained at a previous measurement timing. A correction operation unit, which is coupled to the position measurement unit, the geomagnetic sensor and the memory unit, obtains data related to a true magnetic circle from the first direction data and the second direction data stored in the memory unit and the first direction data and the second direction data respectively obtained at a current measurement timing and for correcting an error contained in the current second direction data in accordance with the data related to the true magnetic circle.

5 Claims, 4 Drawing Sheets

DIRECTION DETECTING DEVICE

BACKGROUND OF THE INVENTION

1. Field of the Invention

The present invention relates to direction detecting devices, and more particularly to a direction detecting device used for a car navigation system.

2. Description of the Prior Art

A direction detecting device uses either a stand-alone type sensor or a GPS (Global Positioning System) receiver which receives an electric wave from a GPS satellite, and measures the position of a movable body in which the GPS receiver is installed. In order to more precisely perform the position measurement, some direction detecting device simultaneously uses both a stand-alone type sensor and a GPS receiver.

Such a direction detecting device using both the GPS receiver and the stand-alone type sensor includes a GPS receiver, a geomagnetic sensor (attitude sensor) for sensing geomagnetism, and a microcomputer. The GPS receiver receives an electric wave from a GPS satellite and generates first direction data from the received electric wave. The geomagnetic sensor detects a horizontal component of very weak geomagnetism approximately equal to 0.3 Gauss, and generates second direction data corresponding to a direction in which a movable body moves. The microcomputer receives the first direction data and the second direction data, and produces direction data therefrom.

When the above-mentioned direction detecting device is installed in an automobile, the following problems occur. A body of the automobile has been slightly magnetized due to geomagnetism, and hence generates a very small magnetic field. As a result, the geomagnetic sensor detects a composite vector of the geomagnetism and the very small magnetic field derived from the vehicle body. Consequently, the second direction data includes an error component. Since the magnetic field derived from the vehicle body is semi-fixed, a fixed component of the magnetic field is detected by making one revolution of the vehicle body, and a correction (rotation correction) is carried out using the above fixed component. In this manner, the error component in the second direction data can be eliminated. However, when the automobile travels in a place where a strong magnetic field is generated, such as a railway crossing, another magnetization takes place and thereby the magnetic field is changed. Hence, the second direction data cannot be accurately calibrated in the above-mentioned manner. In order to perform accurate navigation, the above-mentioned rotation correction must be carried out again. However, this forces the user to have a large load due to the repeated performance of the rotation correction. Further, the output signal of the geomagnetic sensor varies if the detected horizontal components of geomagnetism have differences between position to position.

SUMMARY OF THE INVENTION

It is an object of the present invention to provide a direction detecting device which automatically correct an error component of a geomagnetic sensor so as to stably perform a precise detection, and thereby reducing the load of the user.

According to one aspect of this invention, there is provide a direction detecting device including: position measurement unit for receiving an electric wave from a satellite and for generating first direction data from the electric wave; geomagnetic sensor for generating second direction data; memory unit for storing the first direction data and the second direction data respectively obtained at a previous measurement timing; and correction operation unit, coupled to the position measurement unit, the geomagnetic sensor and the memory unit, for obtaining data related to a true magnetic circle from the first direction data and the second direction data stored in the storage unit and the first direction data and the second direction data respectively obtained at a current measurement timing and for correcting an error contained in the second direction data in accordance with the data related to the true magnetic circle.

The nature, utility, and further features of this invention will be more clearly apparent from the following detailed description with respect to preferred embodiments of the invention when read in conjunction with the accompanying drawings briefly described below.

DESCRIPTION OF THE PREFERRED EMBODIMENT

Figure 1:
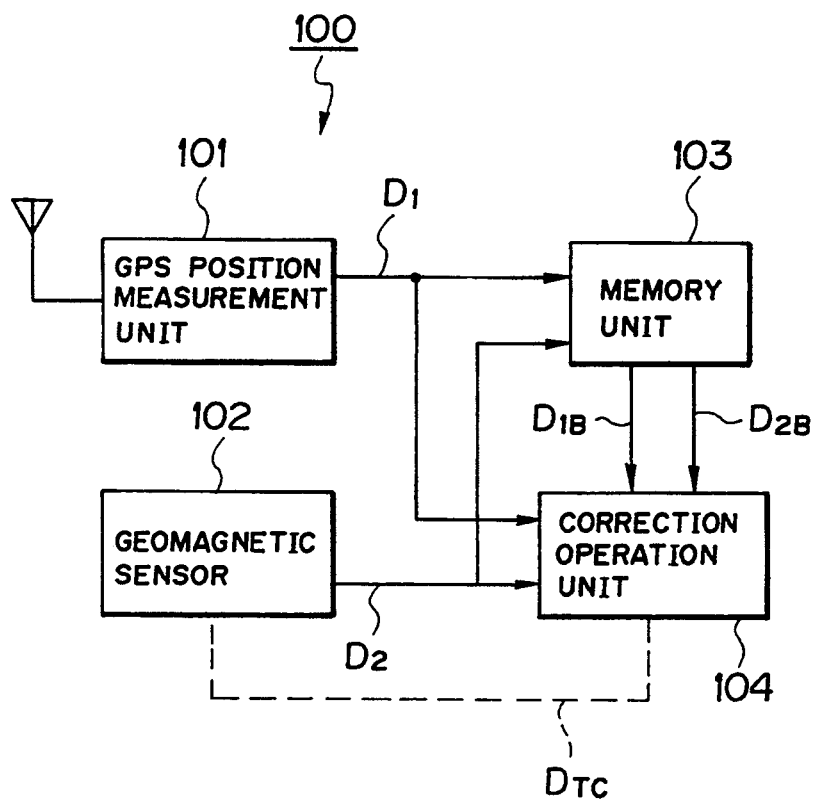
FIG. 1 is a block diagram showing the principle of the present invention.

First, a principle of the present invention will be described with reference to FIG. 1. A direction detecting device 100 includes a GPS position measurement unit 101, a geomagnetic sensor 102, a storage unit 103 and a correction operation unit 104. The GPS position measurement unit 101 receives an electric waveform for position measurement emitted from a GPS satellite (not shown), and generates first direction data $D_1$ therefrom. The geomagnetic sensor 102 generates second direction data $D_2$. The storage unit 103 stores first direction data $D_{1B}$ and second direction data $D_{2B}$ obtained at the previous measurement timing. The correction operation unit 104 obtains a true magnetic circle $D_{TC}$ from the first direction data $D_{1B}$ and $D_1$ respectively obtained at the previous and current measurement timings and the second direction data $D_{2B}$ and $D_2$ respectively obtained at the previous and current measurement timings. Then, the correction operation unit 104 controls the geomagnetic sensor 102 using the true magnetic circle $D_{TC}$. Hence, the geomagnetic sensor 102 always generates precise second direction data $D_2$ based on the latest true magnetic circle $D_{TC}$.

Figure 2:
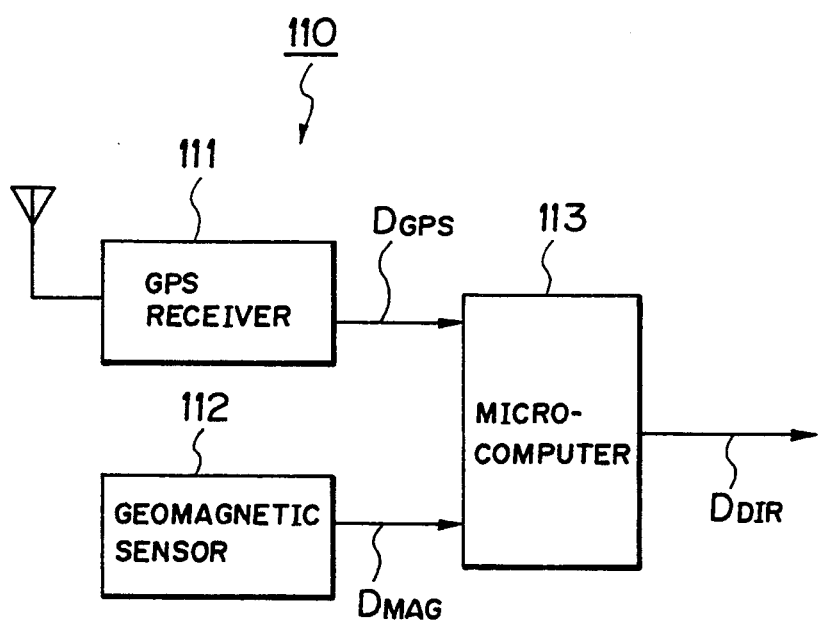
FIG. 2 is a block diagram of a geomagnetic detection device according to an embodiment of the present invention.

FIG. 2 shows a direction detecting device according to an embodiment of the present invention. A direction detecting device 110 shown in FIG. 2 includes a GPS receiver 111, a geomagnetic sensor 112, and a microcomputer 113. The GPS receiver 111 receives an electric wave for position measurement emitted from a GPS satellite, and generates GPS geomagnetic data $D_{GPS}$. The geomagnetic sensor 112 detects a horizontal component of geomagnetism and generates magnetic direction data $D_{MAG}$. The microcomputer 113 receives the GPS direction data $D_{GPS}$ and the magnetic direction data DMAG, and stores, in a built-in memory or an external memory, GPS direction data $D_{GPS}$ and magnetic direction data $D_{MAG}$ respectively obtained at the previous measurement timing, and obtains a magnetic circle data from GPS direction data $D_{GPS}$ and magnetic direction data $D_{MAG}$ respectively obtained at the current measurement timing and the GPS direction data $D_{GPS}$ and magnetic direction data $D_{MAG}$ respectively obtained at the previous measurement timing. Then the obtained magnetic circle data is stored in the microcomputer 113. Further, the microcomputer 113 corrects the geomagnetic sensor 112 using the obtained magnetic circle data in order to obtain more accurate magnetic direction data, and outputs direction data $D_{DIR}$ based on the GPS direction data and the corrected magnetic circle data.

Figure 3:
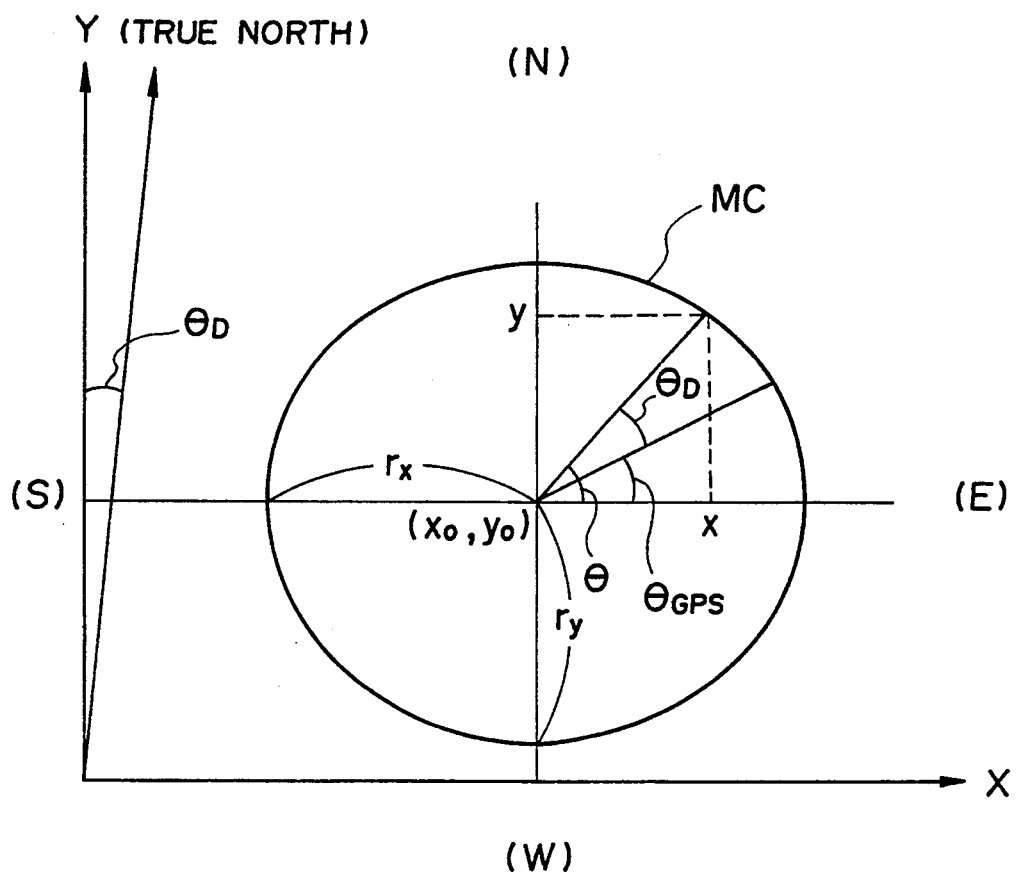
FIG. 3 is a diagram showing a magnetic circle.
Figure 4:
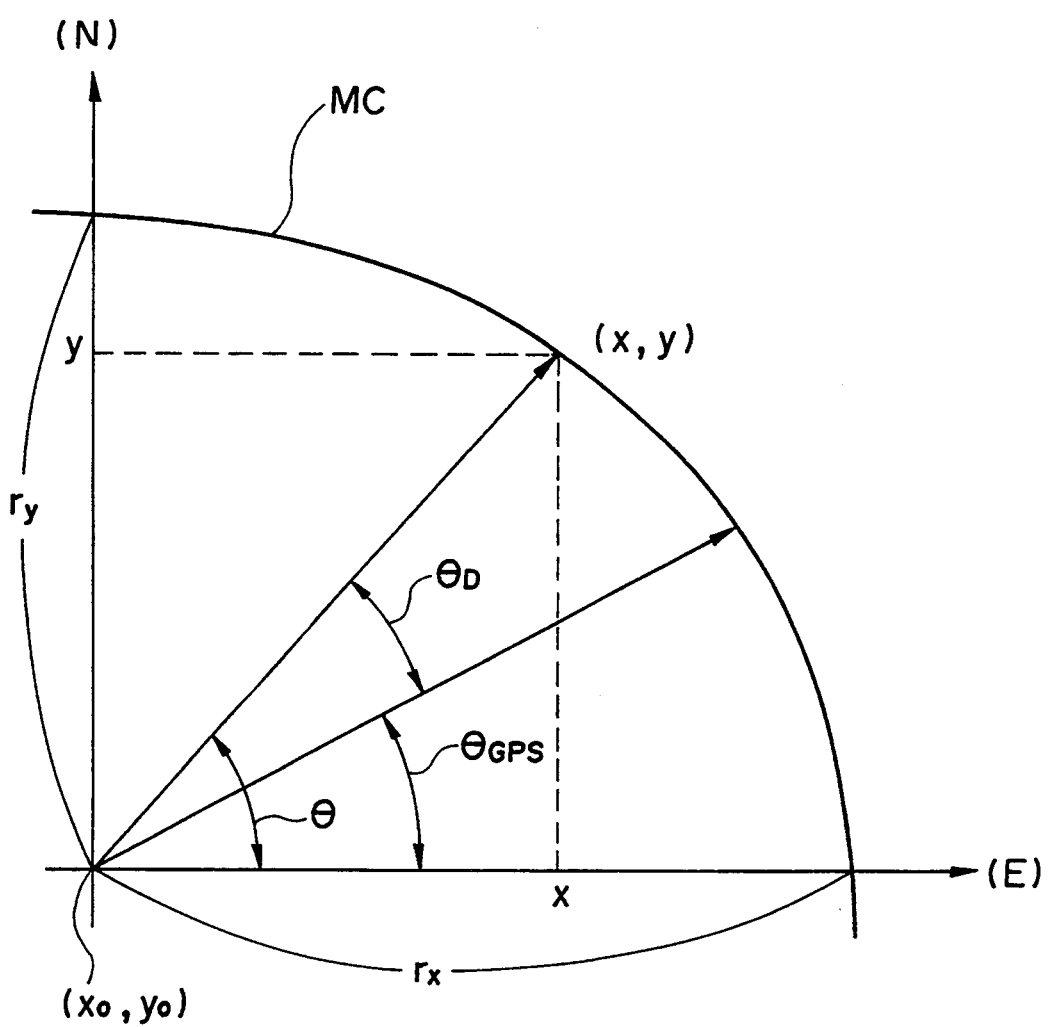
FIG. 4 is an enlarged view of a part of the magnetic circle shown in FIG. 3.
Figure 5:
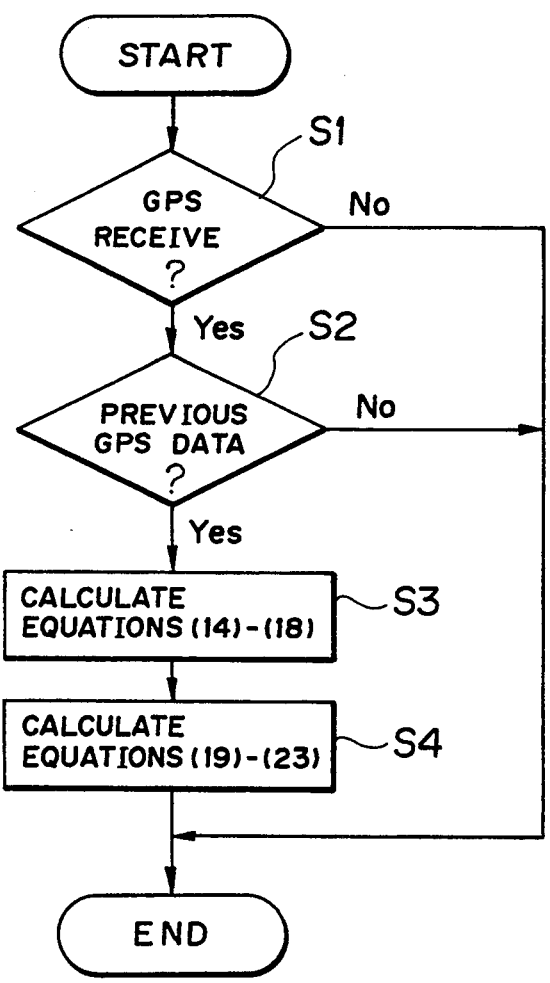
FIG. 5 is a flowchart showing the operation of the geomagnetic detection device according to the present invention.

Next, the operation of correcting the geomagnetic sensor will be described with reference to FIGS. 3 and 4. FIG. 3 is a diagram for explaining a magnetic circle, and FIG. 4 is an enlarged view of a part of the magnetic circle shown in FIG. 3.

As is well known, the north on the maps (true north) deviates from the north of geomagnetism (magnetic north). This deviation (angular difference) is called a declination (true declination). This is due to the fact that the pole of the earth-rotation axis is different from the magnetic pole. For example, the declination in Tokyo and its neighborhood is $-6°$ (this means that the magnetic pole deviates from the true north by 6° on the west thereof). The deviation in San Francisco and its neighborhood is equal to $+15°$ (this means that the magnetic pole deviates from the true north by 15° on the east thereof). Hence, in the navigation devices using the geomagnetic sensors, it is necessary to carry out a declination correction in order to obtain the accurate direction. Further, in actuality, there is an error resulting from the difference between the actual attachment position of the geomagnetic sensor and the designed attachment position. With the above in mind, the present invention handles, as a declination angle $\theta_0$, the sum of the attachment error and the true declination.

In this case, reference direction data $\theta$ (true direction data) corresponding to the GPS direction data $\theta_{GSP}$ can be represented as follows:

$$\theta = \theta_{GPS} + \theta_D$$

where $\theta_{GPS}$ denotes GPS direction data obtained from the GPS position measurement, and $\theta$ denotes a declination angle.

By using the reference direction data $\theta$, magnetic circle data on a true magnetic circle MC is obtained from the following equations:

$$x_0 = x - r_x \cos\theta \qquad (1)$$

$$y_0 = y - r_y \sin\theta \qquad (2)$$

where $(x_0, y_0)$ indicate the coordinates of the origin of the true magnetic circle, $r_x$ denotes the radius of the true magnetic circuit MC along its major axis (an axis in the X direction), $r_y$ denotes the radius thereof along its minor axis (an axis in the Y direction), and $(x, y)$ denote magnetic data indicated by a magnetic direction vector (not shown) obtained by the geomagnetic sensor.

The following table shows a relationship between pieces of the reference direction data $\theta$ respectively obtained at GPS position measurement timings Tn (n: 1−i) and pieces of the magnetic data (x, y) obtained at the respective GPS position measurement timings Tn:

| Timing | Ref. direction $\Theta$ | Magnetic data (x,y) |
| --- | --- | --- |
| $T_1$ | $\Theta_1$ | $(x_1, y_1)$ |
| $T_2$ | $\Theta_2$ | $(x_2, y_2)$ |
| $T_3$ | $\Theta_3$ | $(x_3, y_3)$ |
| . | . | . |
| . | . | . |
| $T_{i-1}$ | $\Theta_{i-1}$ | $(x_{i-1}, y_{i-1})$ |
| $T_i$ | $\Theta_i$ | $(x_i, y_i)$ |

By substituting the data shown in the above table into the equations (1) and (2), the following equations are obtained: at measurement timing T1:

$$x_0 = x_1 - r_x \cos\theta_1 \qquad (3)$$

$$y_0 = y_1 - r_y \sin\theta_1 \qquad (4)$$

at measurement timing T2:

$$x_0 = x_2 - r_x \cdot \cos\theta_2 \qquad (5)$$

$$y_0 = y_2 - r_y \cdot \sin\theta_2 \qquad (6)$$

at measurement timing Ti:

$$x_0 = x_i - r_x \cos\theta_i \qquad (7)$$

$$y_0 = y_i - r_y \sin\theta_i \qquad (8).$$

From the equations (3)–(6), the following parameters at the measurement timing T2 are calculated in the following manners. These parameters are the coordinates $(x_{02}, y_{02})$ of the origin of the true magnetic circle $MC_2$, the major-axis radius $r_{x2}$, the minor-axis radius $r_{y2}$, and an ellipticity $k_2$ which is the ratio of the radii $r_{x2}$ and $r_{y2}$.

The major-axis radius $r_{x2}$ of the true magnetic circle is obtained by solving simultaneous equations (3) and (5) as follows:

$$r_{x2} = (x_1 - x_2)/(\cos\theta_1 - \cos\theta_2) \qquad (9).$$

The minor-axis radius $r_{y2}$ of the true magnetic circle is obtained by solving simultaneous equations (4) and (6) as follows:

$$r_{y2} = (y_1 - y_2)/(\sin\theta_1 - \sin\theta_2) \qquad (10).$$

The coordinates $(x_{02}, y_{02})$ of the origin obtained at the measurement timing T2 can be obtained by substituting the equations (9) and (10) into the equations (1) and (2):

$$x_{02} = (x_2 \cdot \cos\theta_1 - x_1 \cdot \cos\theta_2)/(\cos\theta_1 - \cos\theta_2) \qquad (11)$$

$$y_{02} = (y_2 \cdot \sin\theta_1 - y_1 \cdot \sin\theta_2)/(\sin\theta_1 - \sin\theta_2) \qquad (12).$$

The ellipticity $k_2$ is obtained as follows:

$$k_2 = r_{x2}/r_{y2} \qquad (13).$$

Similarly, the same parameters at the measurement timing $T_i$ are calculated. It will be noted that these parameters are the coordinates $(x_{0i}, y_{0i})$ of the origin of the true magnetic circle $MC_i$, the major-axis radius $r_{xi}$, the minor-axis radius $r_{yi}$, and a ellipticity $k_i$ which is the ratio of the radii $r_{xi}$ and $r_{yi}$:

$$r_{xi}=(x_{i-1}-x_i)/(\cos\theta_{i-1}-\cos\theta_i) \quad (14)$$

$$r_{yi}=(y_{i-1}-y_i)/(\sin\theta_{i-1}-\sin\theta_i) \quad (15)$$

$$x_{0i}=(x_i\cos\theta_{i-1}-x_{i-1}\cdot\cos\theta_i)/(\cos\theta_{i-1}-\cos\theta_i) \quad (16)$$

$$y_{0i}=(y_i\sin\theta_{i-1}-y_{i-1}\cdot\sin\theta_i)/(\sin\theta_{i-1}-\sin\theta_i) \quad (17)$$

$$k_i=r_{xi}/r_{yi} \quad (18).$$

It can be seen from the equations (14)–(18) that the coordinates of the origin of the true magnetic circle, the radii thereof respectively along the major and minor axes, and the ellipticity can be obtained by carrying out the GPS position measurement twice, i.e., from data of successive two measurement. Then, the geomagnetic sensor can be corrected by calibrating geomagnetic data in correspondence with the above parameter information thus obtained.

A correction operation executed by the microcomputer 113 will now be described with reference to FIG. 6. First, the microcomputer 113 determines whether or not the GPS position measurement can be performed, that is, whether or not the GPS receiver 111 can receive the electric wave for use in the position measurement from the GPS satellite (step S1). When it is determined that the GPS receiver 111 cannot receive the electric wave from the GPS satellite, the geomagnetic sensor 112 cannot be corrected. Thus, the microcomputer 113 ends the correction process.

When it is determined, in step S1, that the GPS receiver 111 can receive the electric wave from the GPS satellite, the microcomputer 113 determines whether or not the previous GPS direction data has been stored in the memory (step S2). When it is determined that there is no previous GPS direction data in the memory, the geomagnetic sensor 112 cannot be corrected, and thus the microcomputer 113 ends the correction process. When it is determined, in step S2, that there is the previous GPS direction data stored in the memory, the microcomputer 113 performs the following operations of equations (14)–(18):

$$r_{xi}=(x_{i-1}-x_i)/(\cos\theta_{i-1}-\cos\theta_i) \quad (14)$$

$$r_{yi}=(y_{i-1}-y_i)/(\sin\theta_{i-1}-\sin\theta_i) \quad (15)$$

$$x_{0i}=(x_i\cos\theta_{i-1}-x_{i-1}\cdot\cos\theta_i)/(\cos\theta_{i-1}-\cos\theta_i) \quad (16)$$

$$y_{0i}=(y_i\sin\theta_{i-1}-y_{i-1}\cdot\sin\theta_i)/(\sin\theta_{i-1}-\sin\theta_i) \quad (17)$$

$$k_i=r_{xi}/r_{yi} \quad (18).$$

In this manner, the microcomputer 113 obtains the coordinates of the origin $(x_{0i}, y_{0i})$ of the true magnetic circle, the major-axis radius $r_{xi}$, the minor-axis radius $r_{yi}$, and the ellipticity $k_i$ (step S3).

It can be seen from equations (14)–(18) that the coordinates of the origin $(x_{0i}, y_{0i})$ of the true magnetic circle, the major-axis radius $r_{xi}$, the minor-axis radius $r_{yi}$, and the ellipticity $k_i$ can be obtained by executing the GPS position measurement twice. By correcting the magnetic direction data $D_{MAG}$, it is possible to obtain more accurate magnetic direction data.

The actual measurement process will be affected by an external disturbance due to a fixed magnetic field existing in the vicinity of buildings having reinforcing steel, such as, bridges, high-level (elevated) roads, or large buildings. With the above in mind, the previously obtained parameters, that is, the coordinates of the origin $(x_{0n-1}, Y_{0n-1})$, the major-axis radius $r_{xn-1}$, the minor-axis radius $r_{yn-1}$, and the ellipticity $k_{n-1}$ are stored in the memory. Then, the microcomputer 113 calibrates, using the following equations (19)–(23), the coordinates of the origin $(x_{0n}, y_{0i})$ of the true magnetic circle to be obtained, the major-axis radius $r_{xn}$, the minor-axis radius $r_{yn}$, and the ellipticity $k_n$ by using the stored data obtained at the previous measurement timing and the corresponding data obtained at the current measurement timing, that is, the coordinates $(x_{0i}, y_{0i})$ of the origin of the true magnetic circle, the major-axis radius $r_{xi}$, the minor-axis radius $r_{yi}$, and the ellipticity $k_i$:

$$r_{xn}=r_{xn-1}+h\cdot(r_{xj}-r_{xn-1}) \quad (19)$$

$$r_{yn}=r_{yn-1}+h\cdot(r_{yj}-r_{yn-1}) \quad (20)$$

$$x_{0n}=x_{0n-1}+h\cdot(r_{0j}-x_{0n-1}) \quad (21)$$

$$y_{0n}=y_{0n-1}+h\cdot(r_{0j}-y_{0n-1}) \quad (22)$$

$$k_n=k_{n-1}+h\cdot(k_j-k_{n-1}) \quad (23).$$

In this case, a correction coefficient h is set or changed to a value near zero when much importance is attached to the previously obtained data (i.e., the previous data is reliable). When much importance is attached to the present data, the coefficient constant h is set or changed to a value near 1. At the beginning of the correction operation, initial data having a respective initial value may be used as a previous data at the measurement carried out for the first time (first measurement timing), and the output signal of the geomagnetic sensor may be used from the second measurement timing. It is also possible to determine the initial values of the parameters to appropriate values by an experiment beforehand, this making the parameter values converged at the true values.

What is claimed is:

1. A direction detecting device comprising:
   position measurement means for receiving an electric wave from a satellite and for generating first direction data from the electric wave;
   geomagnetic sensor for generating second direction data;
   memory means for storing the first direction data and the second direction data respectively obtained at a previous measurement timing; and
   correction operation means, coupled to said position measurement means, said geomagnetic sensor and said memory means, for obtaining data related to a true magnetic circle from the first direction data and the second direction data stored in said storage means and the first direction data and the second direction data respectively obtained at a current measurement timing and for correcting an error contained in the current second direction data in accordance with the data related to the true magnetic circle.

2. A direction detecting device as claimed in claim 1, wherein said correction operation means comprises means for storing data related to a previous true magnetic circle and for correcting data related to a current true magnetic data by using the stored data related to the previous true magnetic circle.

3. A direction detecting device as claimed in claim 1, wherein the data related to the true magnetic circle comprises first data indicating coordinates of the true magnetic circle, second data indicating a radius of the true magnetic circle along a major axis thereof, third data indicating a radius along a minor axis thereof, and fourth data indicating an ellipticity of the true magnetic circle.

4. A direction detecting device as claimed in claim 1, where the satellite comprises a GPS (Global Positioning System) satellite.

5. A direction detecting device as claimed in claim 2, wherein said correction operation means corrects data related to a current true magnetic circle by mixing the data related to said previous true magnetic circle and the data related to the current magnetic circle with a certain mixing coefficient.

* * * * *